United States Patent [19]
Holford

[11] Patent Number: 5,708,470
[45] Date of Patent: Jan. 13, 1998

[54] OPTICAL MONITORING SYSTEM APPARATUS

[75] Inventor: John M. Holford, Oakton, Va.

[73] Assignee: Condor Systems, Inc., San Jose, Calif.

[21] Appl. No.: 661,037

[22] Filed: Jun. 10, 1996

[51] Int. Cl.$^6$ .................................................. H04N 7/18
[52] U.S. Cl. .................................................. 348/61; 348/143
[58] Field of Search .................................. 348/143, 37, 40, 348/36, 42, 61, 64, 86, 88, 94, 95, 129, 136, 137, 152, 161, 335, 343, 369, 87

[56] References Cited

U.S. PATENT DOCUMENTS

| | | | |
|---|---|---|---|
| 3,562,419 | 2/1971 | Stewart et al. | 178/6 |
| 3,932,702 | 1/1976 | Shelly et al. | 178/6.8 |
| 4,167,756 | 9/1979 | Smith | 348/143 |
| 4,661,847 | 4/1987 | Weinblatt | 348/78 |
| 4,939,355 | 7/1990 | Rando et al. | 235/467 |
| 4,992,867 | 2/1991 | Weinblatt | 348/78 |
| 5,235,407 | 8/1993 | Spigarelli et al. | 348/87 |
| 5,311,304 | 5/1994 | Monno | 348/87 |
| 5,446,271 | 8/1995 | Cherry et al. | 235/462 |

Primary Examiner—Tommy P. Chin
Assistant Examiner—Y. Lee
Attorney, Agent, or Firm—J. Michael Johnson

[57] ABSTRACT

An optical monitoring system maps high aspect ratio regions of space using an imaging or viewing device that has a field of view with a low aspect ratio and a plurality of mirrors positioned and arranged relative to the imaging device and the region of space such that the plurality of mirrors directs the image of the region of space to the imaging device in a plurality of segments. Each of the segments is smaller than the field of view of the imaging device and all segments fit together in the field of view of the imaging device such that all of the region of space is mapped and monitored by the single imaging device. The present invention eliminates the need for several imaging devices to monitor high aspect ratio regions of space.

9 Claims, 8 Drawing Sheets

*Prior Art*

*Prior Art*

OPTICAL MONITORING SYSTEM APPARATUS

BACKGROUND OF THE INVENTION

1. Field of the Invention

The present invention relates to an apparatus for monitoring a high aspect ratio region or scene using a rectangular, low aspect ratio monitoring apparatus. In particular, the present invention relates to monitoring a highly repetitive scene for changes that can be addressed in real-time.

2. Description of the Related Art

The advent of charge coupled device (CCD) cameras and high speed digital computers has made it possible to automatically monitor objects and/or phenomenon, detect changes and take actions in response to detected changes without human intervention. Furthermore, with sufficient processing speed on the part of the computer, monitoring can be accomplished in real-time. Automated, real-time monitoring systems that combine cameras and computers have been used in applications ranging from intruder detection/ security systems to the monitoring of automated assembly and manufacturing systems. These automated monitoring systems are particularly effective in applications where the reaction time of human monitors is too slow, where the safety of a human monitor is of concern and/or where the human attention span is a problem.

In general, an automatic monitoring system includes one or more cameras connected to a computer system. The camera(s) observe and record a scene containing the objects or region of space to be monitored and the computer system analyzes the recorded information from the scene. The scene can be thought of as a region of space containing information concerning the monitored objects. The monitoring system camera acts to "image" or map a portion of the scene within the field of view (FOV) of the camera onto a focal plane within the camera. The imaged portion of the scene on the focal plane is converted into electrical signals by the camera and transmitted to the computer for processing and information extraction. Both the camera's FOV and the scene are characterized, at least in part, by an aspect ratio. Most commercially available cameras have a FOV with aspect ratios on the order of one which is considered a low aspect ratio. The aspect ratio of the scene depends on the application and can range from a low aspect ratio on the order of one to a very high aspect ratio that is much greater than twenty.

Figure 1:
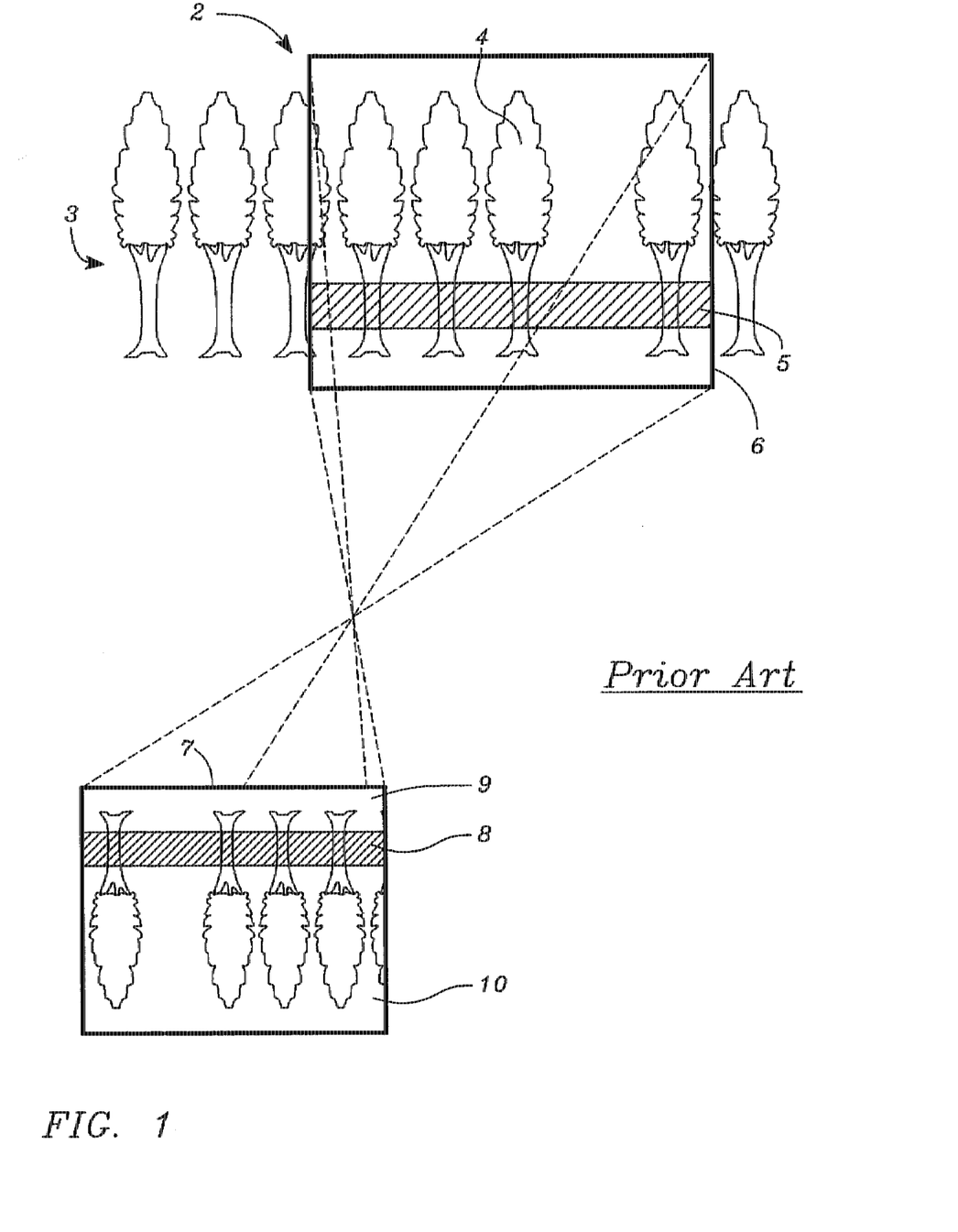
FIG. 1 illustrates the field of view and imaging region of a camera that monitors a scene such as a row of trees.

Among high aspect ratio monitoring applications are monitoring a horizon for the appearance or disappearance of objects, monitoring objects that are arranged in single rows and/or oriented parallel to each other, monitoring objects that are moving through the scene in a parallel manner, and the monitoring and subsequent identification of objects moving through a scene by detecting markings or indicia on the objects. In each of these applications, the information in the scene critical for monitoring purposes is either necessarily confined to a narrow band as in the case of horizon monitoring or is completely represented by a narrow band of the scene. This concept is illustrated in FIG. 1 where a scene 2 consisting of a row of trees 3 is being monitored. The presence or absence of an object such as an individual tree 4 can be detected by its presence or absence in a narrow band 5 within the FOV of a typical camera as represented by a rectangular box 6. The camera maps the portion of the scene 2 in the camera's FOV 6 to an image 7 at the cameras focal plane. The narrow band 5 that contains the information about the scene 2 has a corresponding narrow band 8 in the image 7 within the camera. The information extraction processing within the computer likewise can be confined to the portion of the image 7 contained in the image's narrow band 8. Therefore, portions of the image above and below the narrow band 8, i.e. portions 9 and 10, respectively are unnecessary for the monitoring process.

An example of a monitoring application involving objects that move through a scene is non-contact monitoring of warp threads feeding into a modern textile loom. The warp threads feed into the loom in parallel. An arrangement of cameras coupled to a suitably programmed computer system can monitor the warp threads in real-time as they are fed into the loom enabling real-time detection of broken threads. An example of a monitoring and identification application is the reading of barcodes on train cars moving on a track or boxes on a moving conveyor belt. Since similar principles apply to other applications of real-time monitoring using camera/ computer systems the example of loom monitoring will be used almost exclusively hereinbelow with the understanding that the discussion can readily be applied to many other endeavors by one skilled in the art.

Figure 2A:
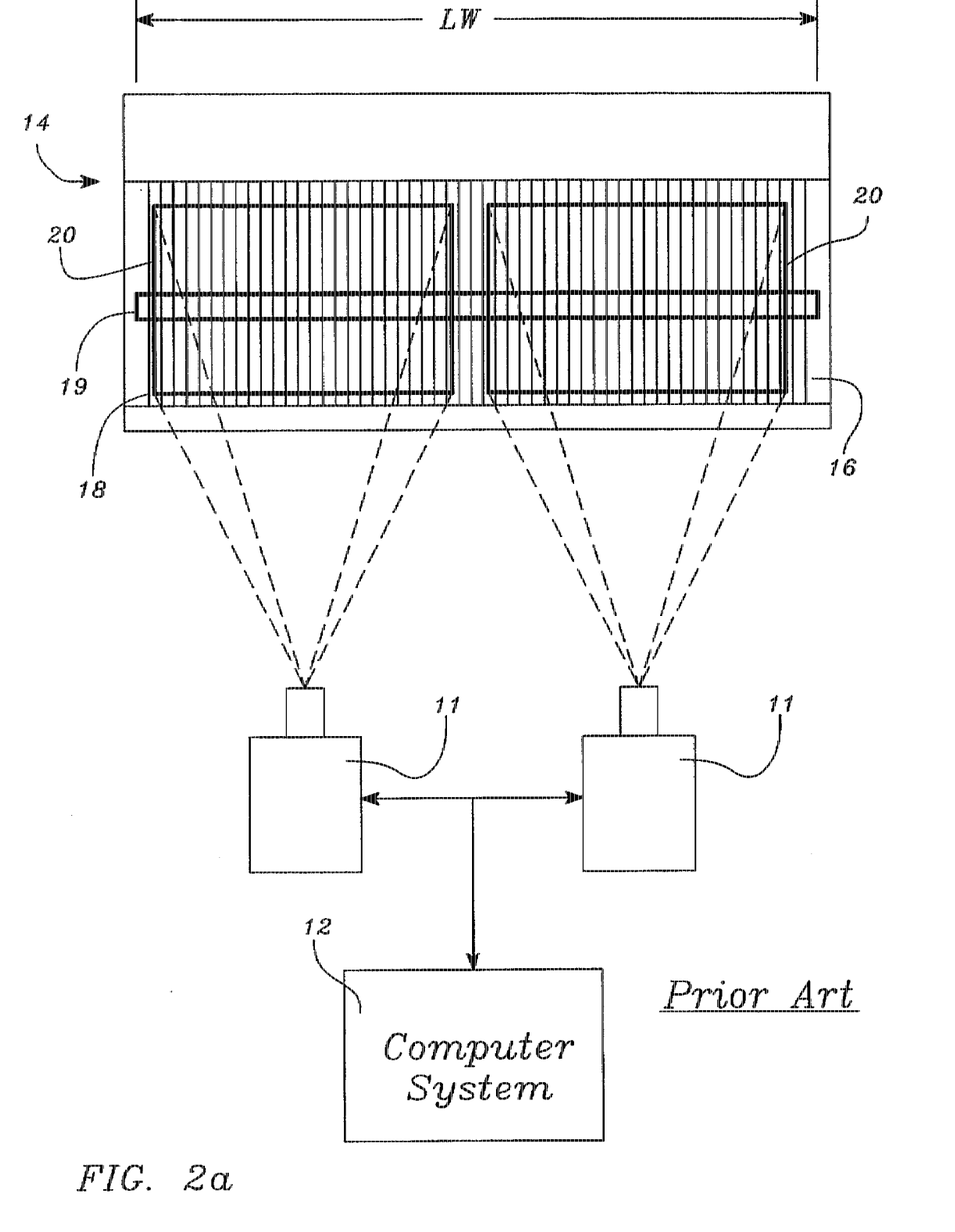
FIG. 2a illustrates a portion of a typical loom and the field of view of a conventional camera/computer automated monitoring system.

The monitoring of the input of a loom by camera/ computer monitoring systems is illustrated diagrammatically in FIG. 2a. FIG. 2a shows a pair of cameras 11, a computer 12, and a loom 14. The computer provides automatic processing of the images recorded by the cameras 11. The loom 14 has an input region 16 where warp threads 18 enter the loom 14 in a parallel manner. The FOV of the camera is represented in FIG. 2a as a rectangular box 20. The computer 12 is programmed to detect the presence of the threads as they move through the camera's FOV 20. If a thread should break the computer 12 detects the break by the difference in the image before and after the break or simply by the absence the broken warp thread 18. The methods employed in detection within the computer are beyond the scope of this discussion.

Referring once again to FIG. 2a it is evident that much of the FOV 20 of camera 11 and the resulting image in the camera 11 is of little or no use to the monitoring system. Since it is of no use, much of the image captured by the camera is wasted. Since the warp threads 18 pass through the camera's FOV 20, detection of a broken thread 18 can be accomplished by considering only a narrow band or box 19 perpendicular to the motion of the threads 18 within the FOV 20 as was illustrated in FIG. 1 for box 5. In fact, all of the warp threads 18 in a loom 14 with width LW could be monitored by considering the long narrow box 19. Also as in FIG. 1, the portions of the image corresponding to the portions of the FOV 20 above and below the intersection of the narrow box 19 and the FOV 20 are effectively wasted portions of the FOV 20 and consequently wasted portions of the image.

The importance of the wasted of portions of the image become apparent when considering the number of camera's 11 necessary to monitor a given scene. To detect an object, an image of the object must be larger in size than the minimum resolution in the camera that is required to ensure detection of an object. In cameras typically used for monitoring purposes two primary factors limit the minimum resolution. These two factors are the diffraction resolution limit imposed by the optics and the number of pixels or picture elements in the focal plane of the camera. In most cases the optics of camera in monitoring applications are chosen such that the ultimate resolution limit is a function of the number of discrete pixels in the focal plane and not the diffraction limit of the optics.

The pixels in the focal plane of the camera generally correspond to the individual sensor elements situated in the camera's focal plane. In a CCD camera the sensors are the charge coupled devices that give the camera its name. These charge coupled devices are generally arranged in a regular, rectangular lattice. A minimum resolution for a modern camera/computer monitoring system is set by the portion of the image that corresponds to a single pixel which in the CCD camera example is a single CCD cell.

The minimum resolution of a camera limits the amount of the scene that can be captured by a single fixed camera. Therefore, it is impractical or impossible to monitor a textile loom with a single camera monitoring system. Typically, an array of cameras is required to monitor the width or linear extent of most modern textile looms, thereby increasing the expense of the monitoring system. Likewise, other high aspect ratio monitoring applications will require multiple camera when minimum resolution is considered. In the illustrated case of FIG. 2 two cameras 11 are depicted. In actual application many more cameras 11 would likely be required.

Another drawback to monitoring systems known in the art is that they require cameras 11 with optics having very a large depth of field. The depth of field must be large in these systems since the distance from the camera to the center of the field of view or scene is much less than the distance from the camera to the edge of the field of view. It is difficult to achieve optics that simultaneously exhibit a large depth of field and a long focal ratio as is required for high resolution imaging.

Figure 2B:
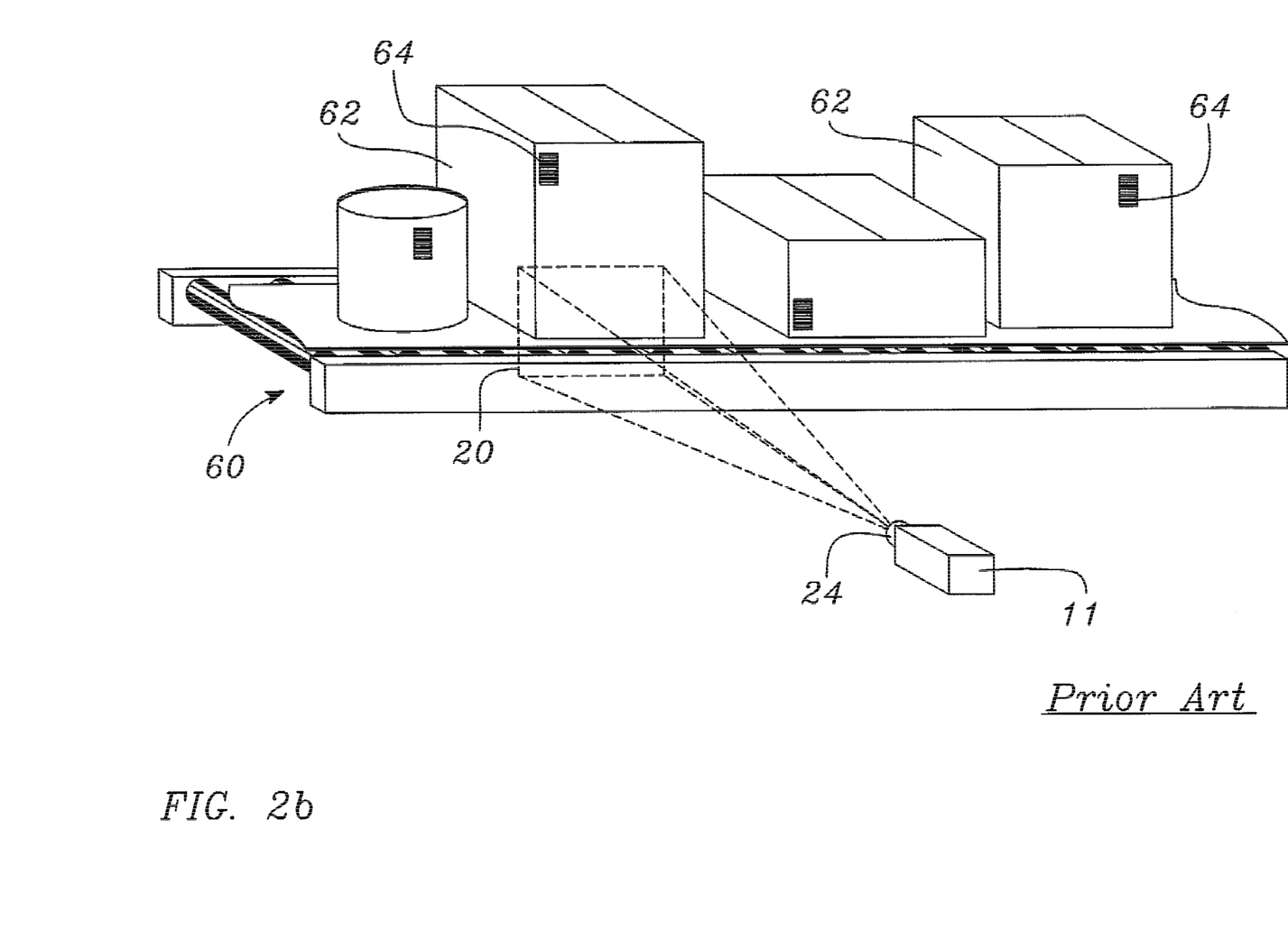
FIG. 2b illustrates a barcode based monitoring and identification application of a conventional automated monitoring system.

Many of these same principles apply to the monitoring and identification application. FIG. 2b illustrates a monitoring and identification application wherein a camera 11 is used to read barcodes 64 on objects 62 passing through the FOV 20 of the camera 11 on a conveyor belt system 60. Since the FOV 20 of the camera 11 is restricted by the resolution considerations discussed above, multiple cameras 11 would be required in the case illustrated in FIG. 2b to ensure that all barcodes 64 are detected regardless of the object 62 size and barcode 64 position on the object. The single camera 11 illustrated in FIG. 2b would fail to detect barcodes 64 that are positioned above the FOV 20.

The discussion herein is based on commercially available cameras having a rectangular image plane with a low length to width ratio hereinafter referred to as aspect ratio. A low aspect ratio combined with the finite imaging resolution afforded by the focal plane array renders the existing camera/computer systems inefficient for the loom monitoring purposes.

As discussed hereinabove it is a characteristic of many monitoring applications such as the aforementioned loom monitoring application, that the information containing region of the image is confined to a narrow horizontal or vertical band within the field of view of the camera. Cases where long narrow images are to be monitored severely under-utilize the available imaging region of the focal plane of the camera. Therefore, better utilization of the available imaging region with fewer cameras in a given monitoring system would solve a long standing need in the art.

SUMMARY OF THE INVENTION

The present invention solves the problem in the related art by providing a system for monitoring regions of space or scenes that have high aspect ratios using an imaging device with a low aspect ratio.

The system of the present invention maps a long narrow object space or object plane ("scene") onto a low aspect ratio image plane of the imaging or viewing device. The system of the present invention comprises an array of mirrors positioned in the field of view of the imaging device between the scene and the imaging device that enables a high aspect ratio scene of a region of space to be efficiently viewed in a low aspect ratio, rectangular field of view of the imaging device, for example a typical camera. The mirrors that make up the array of mirrors are arranged in such a way as to form images of individual segments of the objects in the long narrow scene being monitored on successive vertically stacked segments of a rectangular image plane of the imaging device. The arrangement of the mirrors in the mirror array is such that all of the individual object plane segments are in focus when projected onto the focal plane of the imaging device.

In the preferred embodiment the imaging means is a camera such as a CCD camera. The system may also comprise a computer for processing the information received by the imaging means to provide real-time monitoring of the status of an object or scene.

Examples of monitoring situations with high aspect ratio scenes include monitoring the horizon for the appearance or disappearance of objects, monitoring objects that are arranged in single rows and/or oriented parallel to each other, and monitoring objects that are moving through the scene in a parallel manner such as monitoring textile or fiber manufacturing looms for broken threads or other defects and the monitoring and subsequent identification of objects moving through a scene by detecting markings or indicia on the objects. In each of these applications, the information in the scene critical for monitoring purposes is either necessarily confined to a narrow band as in the case of horizon monitoring or is completely represented by a narrow band of the scene. Among the chief advantages of the present invention is that a single means for imaging can be used where multiple means for imaging are required without the present invention.

BRIEF DESCRIPTION OF THE DRAWINGS

Further details are explained below with the help of the examples illustrated in the attached drawings in which.

DETAILED DESCRIPTION OF THE PREFERRED EMBODIMENT

Figure 3:
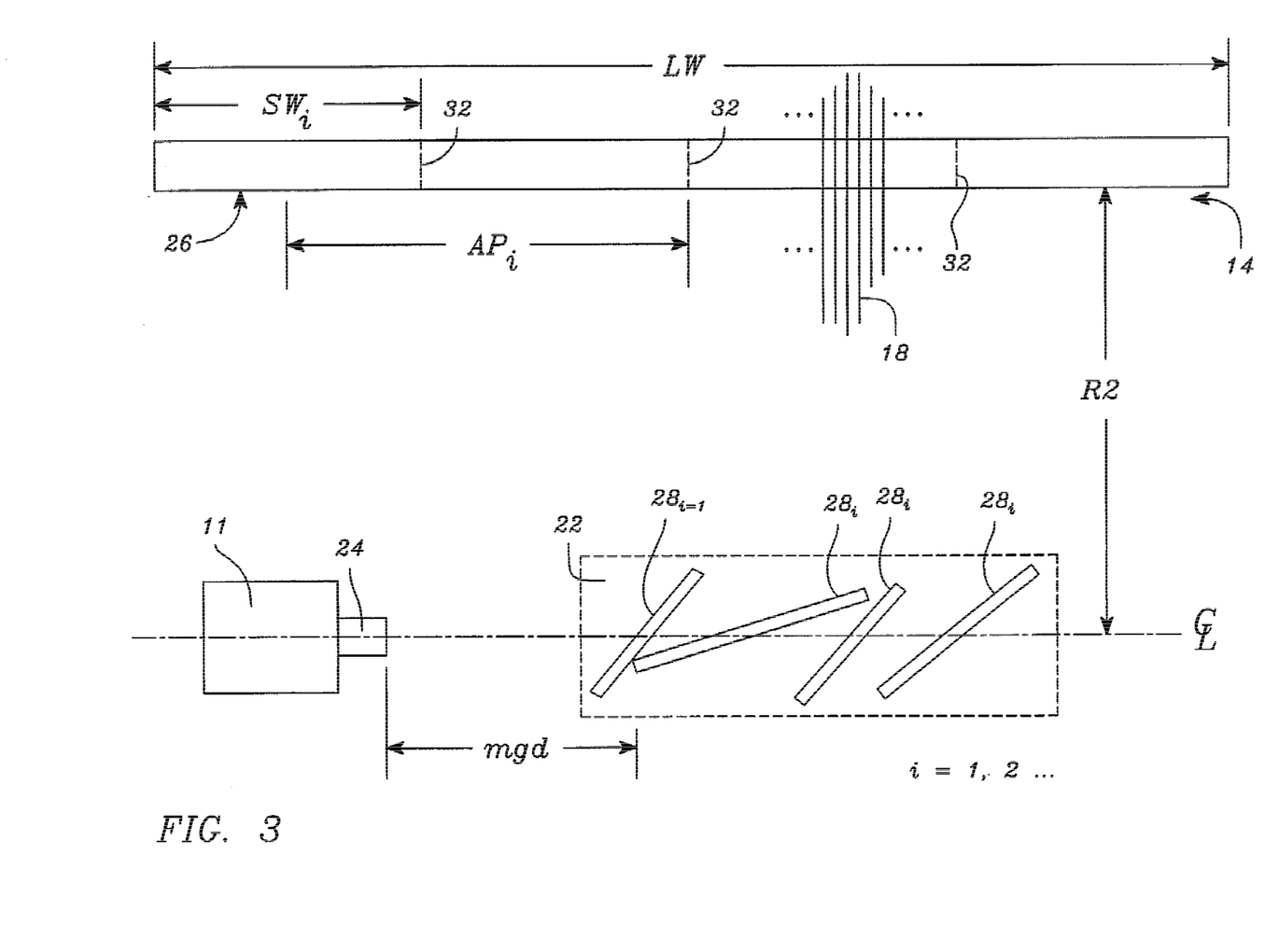
FIG. 3 illustrates block diagram of an automated monitoring system of the present invention that is monitoring a textile loom.

The preferred embodiment of the monitoring system of the present invention is illustrated in block diagram form in FIG. 3. The optical monitoring system monitors a scene 26 such as warp threads 18 at the input of a loom, and comprises a mirror array 22 and a means for imaging or an imaging apparatus such as a camera 11. In the preferred embodiment the imaging apparatus is a video camera with a charge coupled device (CCD) focal plane array. An essentially equivalent alternative camera 11 is an analog video camera with an analog to digital converter that converts the video frames from an analog form into a digital form suitable for processing in the computer 12. A lens assembly 24 is used to focus an image onto the camera's focal plane. A typical scene 26 herein has an aspect ratio AR equal to 20.0+/−10.0 or more while the camera's focal plane and the corresponding FOV have an AR equal to 2.0+/−0.5.

The principle element of the monitoring system of the present invention is the mirror array 22. The novel action of the mirror array 22 when used in the context of the present invention is to enable a single camera 11 with a low aspect ratio FOV to monitor a very high aspect ratio scene. The mirror array 22 accomplishes this objective by directing portions of the scene delineated in FIG. 3 by dashed lines 32 to different portions of the focal plane within the camera 11 effectively using the aforementioned wasted portion of the image as in the related art.

The mirror array 22 is made up of one or more mirrors $28_i$, where i=1 to N and N is a positive integer less than ∞, each mirror $28_i$ having a center line and an inner and outer portion. The mirrors $28_i$ are arranged at specific distances from the camera and angled in a specific manner relative to the camera and an object plane so as to direct a portion of the object plane into a portion of an image plane of the camera.

Herein the object plane will be defined as a plane in the scene 26, perpendicular to the line of sight and the image plane will be the plane in the camera containing the imaging apparatus such as the CCD array. In the case of a loom 14 monitoring application, the object plane is the plane containing the warp threads 18. The resolution at the image plane is related to the resolution in the object plane by the magnification of the camera's optics 24.

Figure 4:
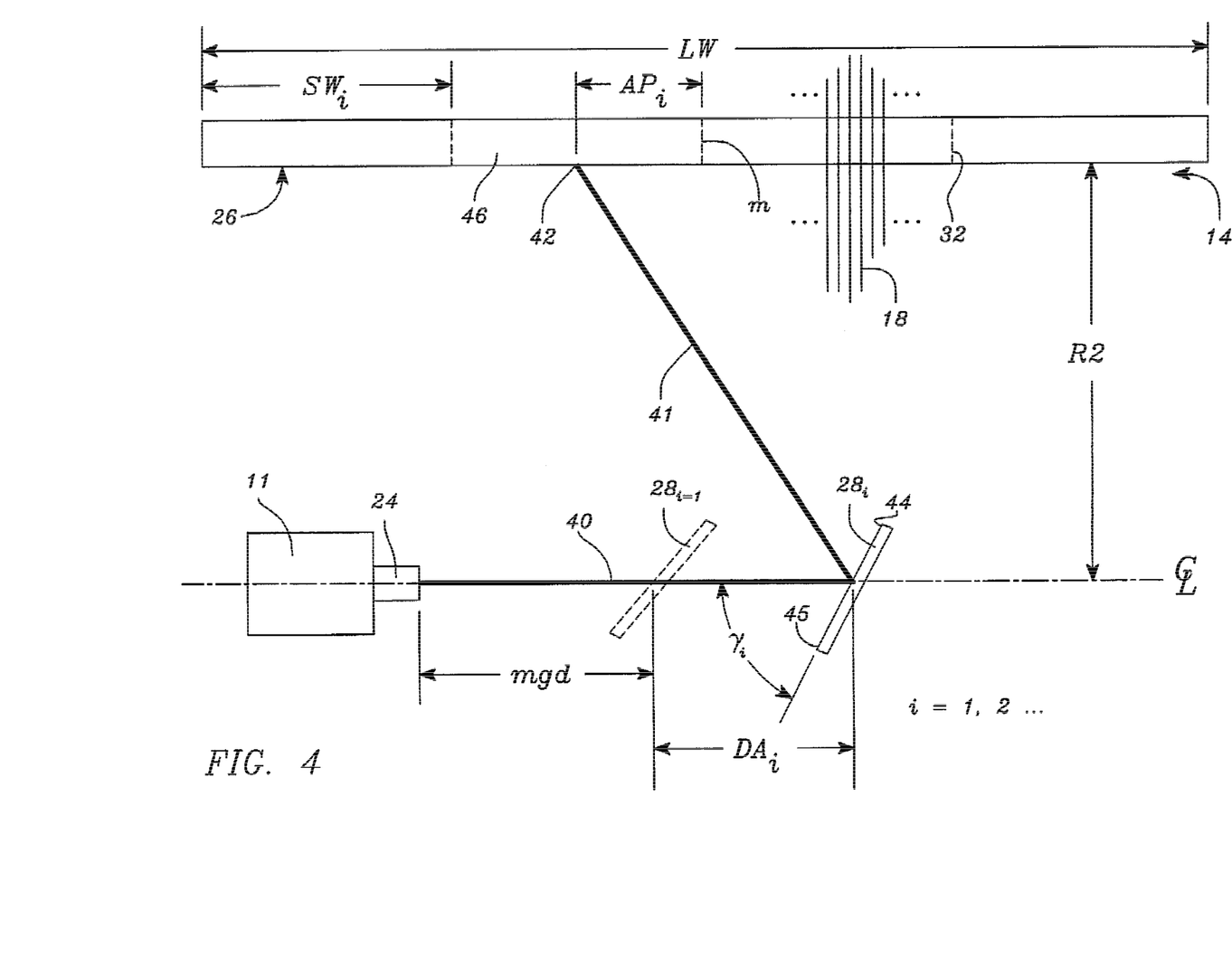
FIG. 4 illustrates a schematic view of the monitoring system of FIG. 3 indicating key dimensions as they apply to one of the mirrors in the mirror array.

The location and orientation of the mirrors that enables the optical monitoring system of the present invention to work is determined by following a set of steps as described hereinbelow. Key dimensions and elements in the steps are illustrated in FIG. 4.

Figure 5:
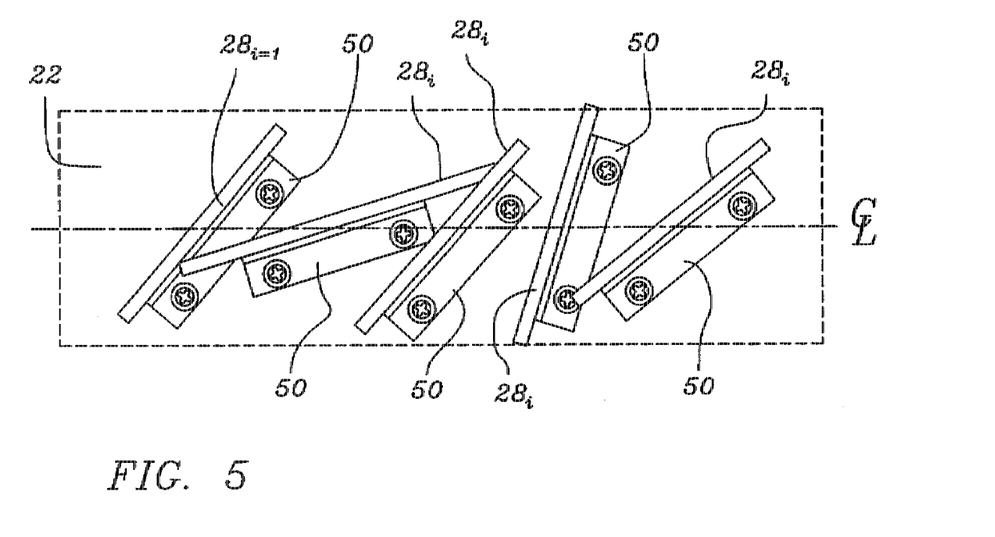
FIG. 5 illustrates an embodiment of the mirror array of FIG. 3 as viewed from above.
Figure 6:
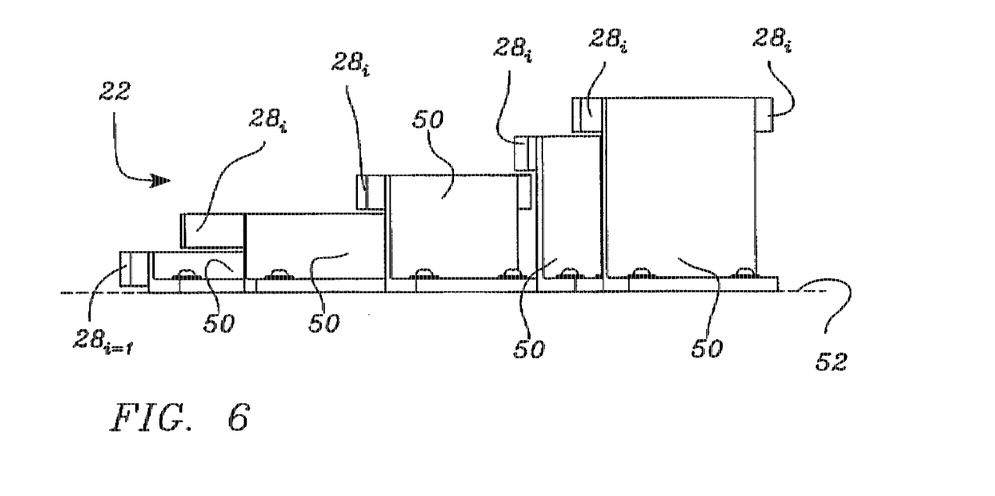
FIG. 6 illustrates the mirror array of FIG. 5 as viewed from the back.
Figure 7:
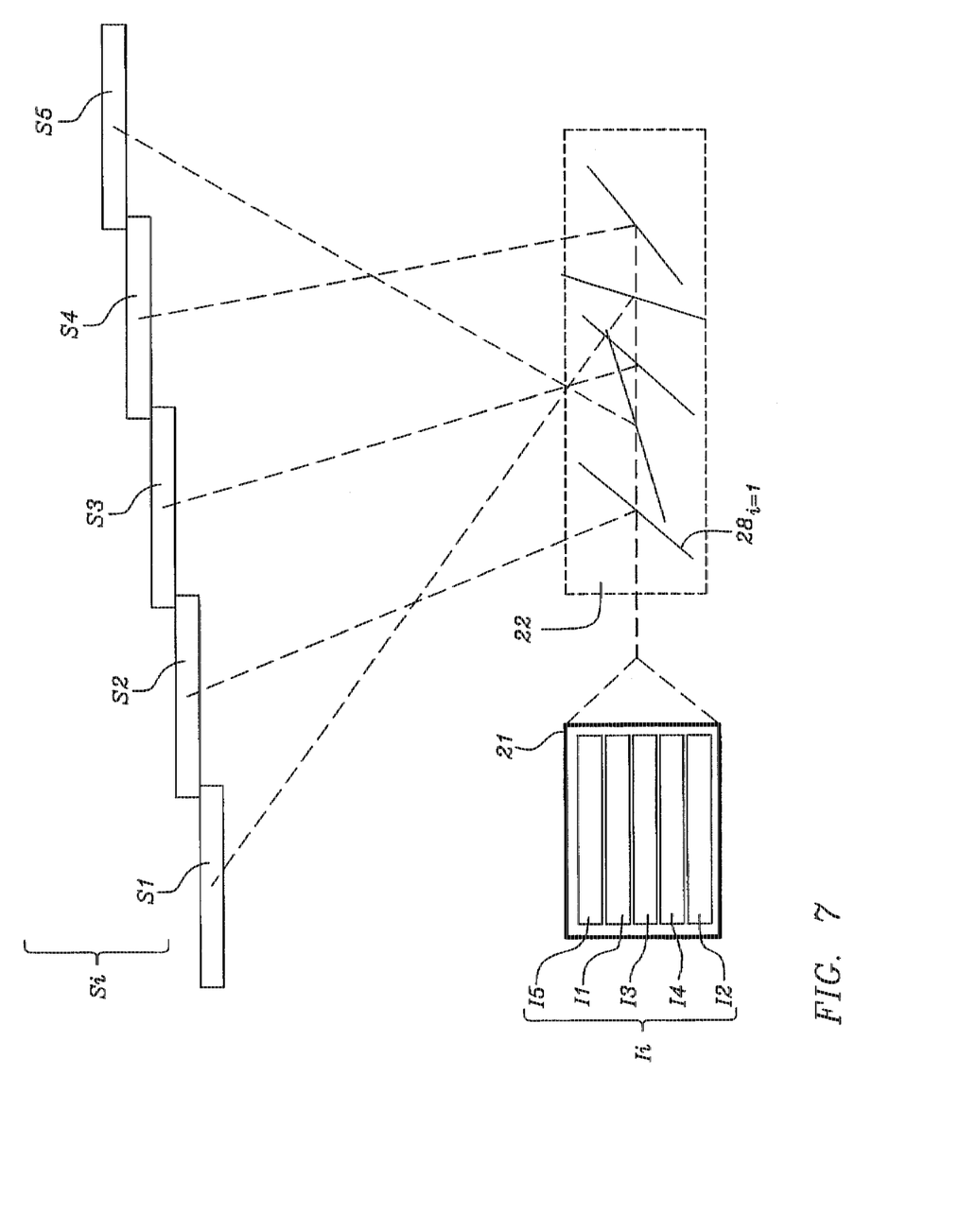
FIG. 7 illustrates the relationship between the imaged space and the image as projected onto the focal or image plane of a camera by the action of the mirror array of FIG. 4.

A top view of the mirror array 22 is illustrated in FIG. 5. The mirror array 22 as viewed from behind is illustrated in FIG. 6. In the preferred embodiment the mirrors $28_i$ are supported by mirror supports 50 that fix the height and orientation of the mirrors $28_i$. The mirror supports 50 are, in turn, rigidly connected to a base 52. The mirror array 22 of the present invention breaks up a long, low aspect ratio region of the scene 26 into a number of individual segments 46 separated by boundary lines 32 in FIG. 4. The images of the individual segments Si are directed by the mirrors $28_i$ in the mirror array 22 to successive, vertically stacked strip images Ii in the image plane 21 as illustrated in FIG. 7. The procedure for locating the mirrors in the array, orienting them relative to the camera and object plane as well as for determining the mirror widths and heights for proper operation are given in detail below.

Hereinafter, the scene being monitored will be assumed to be the input section 12 of a loom 14 illustrated in FIGS. 3 and 4. It is to be understood that the choice of a loom 14 as the object being monitored in no way limits the applicability of the monitoring system to other linearly extended monitoring tasks. The process for arranging the mirrors in the mirror array begins by defining the location of the first mirror in the array and the width of the object, in this case a loom, that is to be monitored.

Referring back to FIG. 4 the mirrors $28_i$ of the mirror array 22 are arranged on a centerline C/L which is parallel to the center line of the scene 26. Let mgd be the distance from the camera to the centerline C/L of the first mirror $28_{i=1}$. The distance from the center line to a midpoint m of the loom 14 is R2. The width of the loom is LW and the width of a segment Si of the loom 14 covered by a given mirror is denoted $SW_i$ for segment width. The distance from the midpoint m of the loom 14 to the point corresponding to the center of a segment 46 at which the center of the camera's optics 24 is to be pointed is the aim point ($AP_i$).

The arrangement of mirrors $28_i$ of the mirror array 22 is directly related to the characteristics of the object being imaged and the imaging system being used. For the purposes of discussion the imaging system hereinafter is referred to as a camera 11 and lens 24.

A modem video camera 11 is normally characterized by a number of parameters, including the charge coupled device (CCD) array. The CCD array is the means by which an image is converted to an electrical signal for transmission to a storage or viewing device. The CCD array is usually made up of a regular rectangular lattice of sensing elements known as pixels. The number and spacing of the pixels in the horizontal and vertical directions on the CCD array determines, in part, the resolution of the camera 11. A second set of parameters that characterize a camera are those associated with the camera's optics or lens system 24. The lens system 24 characteristics include the focal length, focal ratio f#, the depth of field, and the effective aperture. These terms and the relationships between them are well known in the art.

The focal length of the camera 11 is denoted by fl while the camera's focal ratio is denoted f#. The center to center spacing of the pixels in the camera CCD array are $ES_h$ and $ES_v$ for the horizontal and vertical spacing, respectively. The magnification factor is denoted by M. The actual resolution at the object plane is denoted $RES_h$ and $RES_v$ in the horizontal and vertical directions, respectively. The diameter of the effective aperture of the lens of the camera is $A_e$ and the camera's depth of field is given by FO.

The number of elements in the camera's CCD array is nhp by nvp. The number of mirror strips to be used is nf which is equal to the number of segments $S_i$ into which the object plane image is to be broken. The height of the object is $H_o$. The height of a given mirror $28_i$ is $H_o$. The height of the ith mirror $28_i$ is $HM_i$. The width of the mirror $28_i$ is $WM_i$ with $IM_i$ being the distance from the centerline of the mirror $28_i$ to the edge closest to the object plane and $OM_i$ being the distance from the mirror $28_i$ centerline C/L to the edge of the mirror $28_i$ farthest from the mirror centerline C/L. A factor $k_a$ is used to avoid diffraction limitations on the optics.

The implementation of a mirror array 22 of the present invention involves establishing the values of a number of variables. Some of the variable values may be chosen by the artisan and are independent variables and some are dependent on the choices made. In most cases, the distinction between variables that are independent and dependent is up to the artisan.

For example, consider situation where the distance from the mirror array 22 to the object plane residing in the input region 16 of loom 14 is specified as R2 and the loom width is LW. Let the number of mirrors $28_i$ in the mirror array 22 be arbitrarily chosen to be nf. The variable nf is used in the equations to avoid confusion with the subscript variable i. Also consider a camera with nhp pixels in the horizontal direction and nhv pixels in the vertical direction with a pixel to pixel spacing of $ES_h$ and $ES_v$ in the horizontal and vertical directions respectively. Let the wavelength of light be $\lambda$ and the diffraction factor be given by $k_o$. Under these constraints, the segment width SW is given by equation (1) while the resolutions in the vertical and horizontal directions are given by equations (2) and (3) below.

$$SW = \frac{LW}{nf} \tag{1}$$

$$RES_h = \frac{SW}{nhp} \tag{2}$$

$$RES_v = \frac{ES_v}{ES_h} \cdot RES_h \tag{3}$$

Next the magnification required can be determined from the ratio of the horizontal resolution at the object plane $RES_h$, and the horizontal pixel spacing denoted by $ES_h$ as in equation (4). Using M from equation (4) and the distance R2 to the object plane the focal length fl can be calculated using equation (5).

$$M = \frac{RES_h}{ES_h} \tag{4}$$

$$fl = \frac{R2}{M+1} \tag{5}$$

The depth of field FO must be large enough to view the image created due to the most tilted segment clearly but not so large that the diffraction limit of the optics is exceeded. Equation (6) gives the required depth of field, $FO_{needed}$, in terms of the loom width LW and the segment width SW and the distance R2. The minimum required focal ratio $f\#_{min}$ is then calculated using equation (7) from the depth of field from equation (6) and the magnification M and horizontal pixel spacing $ES_h$. The maximum focal ratio $f\#_{max}$ can be determined using equation (8). Generally, the maximum focal ratio $f\#_{max}$ and minimum focal ratio $f\#_{min}$ are not equal but represent a range of acceptable values for the focal ratio f#. While several potentially good choices exist, if the maximum $f\#_{max}$ is larger than the minimum $f\#_{min}$ of equation (7), an optimum focal ratio f# given by the geometric mean of the minimum focal ratio $f\#_{min}$ and maximum focal ratio $f\#_{max}$ as in equation (9). Having selected an appropriate focal ratio f#, the effective aperture $A_e$, of the camera optics 24 can then be calculated using equation (10). With these values, a camera 11 and lens 24 system can be selected for use with the mirror array 22 for monitoring the input region 16 of a loom 14 or a similar scene having a high aspect ratio.

$$FO_{needed} = \sqrt{R2^2 + \left(\frac{LW}{2}\right)^2} - \sqrt{R2^2 + \left(\frac{LW}{2} - SW\right)^2} \tag{6}$$

$$f\#_{min} = \frac{FO_{needed}}{2 \cdot ES_h \cdot M \cdot (M+1)} \tag{7}$$

$$f\#_{max} = \frac{RES_h \cdot fl}{k_o \cdot \lambda \cdot R2} \tag{8}$$

$$f\# = \sqrt{f\#_{min} \cdot f\#_{max}} \tag{9}$$

$$A_e = \frac{fl}{f\#} \tag{10}$$

If, upon comparison of the focal ratio f# values of equation (7) and equation (8) it is found that the maximum focal ratio $f\#_{max}$ is smaller than the minimum focal ratio $f\#_{min}$, an optimum focal ratio f# cannot be determined using equation (9). In this circumstance, it is necessary that one or more of the independent variables be changed so that the minimum focal ratio $f\#_{min}$ is less than the maximum focal ratio $f\#_{max}$. For instance, it may be possible to change the distance R2 and in order to achieve a minimum focal ratio $f\#_{min}$ that is less than the maximum focal ratio $f\#_{max}$ as calculated by equations (7) and (8) respectively. Alternatively, the number of mirrors, nf, in the array 22 may be changed. Changing the number of mirrors $28_i$, in turn, changes the segment widths, $SW_i$, enabling the desired relationship between the minimum focal ratio $f\#_{min}$ and the maximum focal ratio $f\#_{max}$ to be achieved.

Having selected a camera 11 and associated optics 24, the next step in designing a mirror array 22 in this example of a loom monitoring application is to compute the mirror guard distance mgd. The mirror guard distance mgd is the distance from the camera lens 24 to the first mirror $28_{i=1}$ in the mirror array 22. The mirror guard distance mgd, is calculated using the vertical resolution $RES_v$ desired, the number nf, of mirrors in the array, and the number of pixels in the vertical direction on the CCD array. Equation (11) gives the height of a segment 46 in the object plane in terms of the number of vertical pixels nvp, in the CCD array and the desired vertical resolution $RES_v$. The result of equation (11) can then be used in equation (12) to find the mirror $28_i$ height $H_s$. The mirrors $28_i$ are generally long and narrow due to the nature of the application and are referred to hereinafter as strips or strip mirrors in an interchangeable manner. The term "strip" leads, in ram, to the subscript "s" used for the mirror or strip height $H_s$. It is also understood that there are different strip heights $H_s$ for each of the mirrors $28_i$ even though the subscripts on $H_s$ have been omitted for clarity.

The mirror guard distance mgd is given by equation (13) in terms of distance R2, the effective aperture $A_e$ of equation (10), and the strip height, $H_s$, of equation (12). As stated, the mirror guard distance mgd of equation (13) gives the distance from the camera lens 24 and the mid-line or center line C/L of the first mirror $28_{i=1}$ of the mirror array 22.

$$H_o = nvp \cdot RES_v \tag{11}$$

$$H_s = \frac{H_o}{2 \cdot nf - 1} \tag{12}$$

$$mgd = \frac{R2 \cdot A_e}{H_s + A_e} \tag{13}$$

Placing the mirrors $28_i$ closer to the camera than mgd would result in a loss of contrast as the images of adjacent mirrors would overlap. Placing mirrors farther than mgd increases the mirror size which is undesirable. Thus the mirrors are placed as close as possible to mgd consistent with the other requirements disclosed herein.

The first mirror $28_{i=1}$ images one of the segments Si into the lowest portion of the image plane 21. In the specific example illustrated in FIG. 7 the first mirror $28_i$ for i=1 images the second segment S2 into the lowest image plane 21 portion labeled I2. Successive mirrors $28_i$ image the other segments (S1 and S3-S5) across the width of the object plane to successively higher portions of the image plane 21. As illustrated in FIG. 7 this imaging by successive mirrors $28_i$ results in the sequential stacking in the image plane 21 of the images I4, I3, I1, and I5 corresponding to the segments S4, S3, S1 and S5 respectively.

Successive mirrors $28_i$ are located at distances farther away from the lens 24 than the minimum guard distance mgd in such a way that the differences in path length from the lens 24 to the aim points $AP_i$ is minimized. The minimization of path length difference between aim points $AP_i$ within each of the segments $S_i$ minimizes the constraints on the lens system 24. Denoting the individual mirrors $28_i$ in the array 22 by a subscript i where i=1 refers to the first mirror $28_{i=1}$, the distances from the first mirror $28_{i=1}$ centerline to the centerlines of the mirrors $28_i$ where runs from i=2 through i=nf mirror segments are given by $DA_i$. $DA_i$ can be found for each of the mirrors $28_i$ for i=2 through nf by considering the aim points $AP_i$ of the segments $S_i$ and calculating the radial distance $RD_i$ for each segment. Equation (14) gives the aim point $AP_i$ for the ith segment $S_i$ in terms of its segment width SW of equation (1), the index i, and the loom 14 width LW. The radial distance $RD_i$ for the ith segment is then given by equation (15). The distance $DA_i$ from the first mirror $28_{i=1}$ to the ith mirror $28_i$, is then given by equation (16). Next, the orientation of the individual mirrors must be determined.

$$AP_i = SW \cdot \left( i - \frac{1}{2} \right) - \frac{LW}{2} \tag{14}$$

$$RD_i = \sqrt{(R2 + mgd)^2 + AP_i^2} \tag{15}$$

$$DA_i = \max_{\forall i}(RD_i) - RD_i \tag{16}$$

The proper angle of the ith mirror $28_i$ must be determined such that the center of the ith segment $S_i$ is properly imaged onto the center of the image plane 21 containing the CCD array. Referring to FIG. 4, the angle of the ith mirror $28_i$ relative to a line between the camera and the mirror is $\gamma_i$. The angle $\gamma_i$ is given by equation (17) where $AP_i$ and $DA_i$ are the aim point of the ith segment $S_i$ and the distance from the first mirror $28_{i=1}$ to the ith mirror $28_i$ respectively and the angle $\psi_i$ is given by equation (18). Finally, the height and width of each mirror in the array can be determined. All angles referred to herein are in radians.

$$\gamma_i = \frac{\psi_i}{2} + \frac{\pi}{4} \tag{17}$$

$$\psi_i = \tan^{-1}\left( \frac{AP_i + DA_i}{R2} \right) \tag{18}$$

The height $HM_i$ of the ith mirror $28_i$ is given by equation (19). The actual mirror height $HM_i$ in equation (19) is related to the distance R2 from the loom 14 to the mirror array 22, the segment height $H_{s_i}$ of equation (12), and the total distance, $TD_i$ from the camera lens 24 to the mirror $28_{i=1}$ centerline C/L. The width $WM_i$ of the ith mirror $28_i$ is the sum of the distance from the centerline C/L of the mirror $28_i$ to the inside edge 44 of the mirror $28_i$ denoted $IM_i$, and the distance from the centerline C/L of the mirror $28_i$ to its outside edge 45. The inside edge 44 refers to the edge of the mirror $28_i$ closest to the loom 14 and the outside edge 45 refers to the edge of the mirror $28_i$ farthest from the loom 14. These distances, $IM_i$ and $OM_i$, are given by equations (20), (21) respectively. The width $WM_i$ of the ith mirror is given by equation (22) as the sum of distances $IM_i$ and $OM_i$.

The lengths of the segments $\overline{CD_i}$ and $\overline{BD_i}$ referred to in equations (20) and (21) are given by equations (23) and (24) respectively with $\psi$, $\alpha$, $\beta$, and $\delta$ given by equations (18), (25), (26) and (27). As before, each of these intermediate results in equations (19) through (27) has a subscript that corresponds to the ith mirror $28_i$ in the mirror array 22.

$$HM_i = \frac{2 \cdot TD_i \cdot H_{s_i}}{TD_i + R2} \tag{19}$$

$$IM_i \cong CD_i + A_o \tag{20}$$

$$OM_i \cong BD_i + A_o \tag{21}$$

$$WM_i \cong IM_i + OM_i \tag{22}$$

$$CD_i = \frac{TD_i \cdot \sin(\tan^{-1}(\alpha_i) - \tan^{-1}(\beta_i))}{\sin\left( \frac{\pi}{2} - \gamma_i - \tan^{-1}(\beta_i) \right)} \tag{23}$$

$$BD_i = \frac{TD_i \cdot \sin(\tan^{-1}(\delta_i) - \tan^{-1}(\alpha_i))}{\sin\left( \frac{\pi}{2} - \gamma_i - \tan^{-1}(\delta_i) \right)} \tag{24}$$

$$\alpha_i = \frac{TD_i \cdot \sin(\psi_i) + DA_i + AP_i}{TD_i \cdot \cos(\psi_i) + R2} \tag{25}$$

$$\beta_i = \frac{TD_i \cdot \sin(\psi_i) + DA_i + AP_i - \frac{SW_i}{2}}{TD_i \cdot \cos(\psi_i) + R2} \tag{26}$$

$$\delta_i = \frac{TD_i \cdot \sin(\psi_i) + DA_i + AP_i + \frac{SW_i}{2}}{TD_i \cdot \cos(\psi_i) + R2} \tag{27}$$

Given the width $WM_i$ and the tilt angle $\gamma_i$ of the mirrors $28_i$, their individual locations can be determined in a Cartesian coordinate system with the center of the lens 24 being taken as the point $\{x=0, y=0\}$. The two ends of the ith mirror $28_i$ are given in such a coordinate system by equations (28) and (29).

$$P1_i = \{TD_i - OM_i \cdot \cos(\gamma_i), -OM_i \cdot \sin(\gamma_i)\} \tag{28}$$

$$P2_i = \{TD_i + IM_i \cdot \cos(\gamma_i), IM_i \cdot \sin(\gamma_i)\} \tag{29}$$

In practice, the mirror $28_i$ heights HM are ordered so that the mirrors $28_i$ closest to the camera lens 24 are the lowest. This prevents blockage of one mirror $28_i$ by the supports 50 of other mirrors $28_i$. The mirror array 22 is built by attaching mirrors $28_i$ of height HM and width WM determined above to supports 50 as illustrated in FIG. 5 and 6. The supports 50 hold the mirrors $28_i$ in the locations and orientations determined above.

A prototype mirror array 22 was designed and constructed. The object width or loom width LW=5 feet. The number of mirrors nf=6. These parameters and additional parameters of the prototype are summarized in Table 1.

TABLE 1

Input parameters for the prototype mirror array design.

| Parameter | Variables | Value |
|---|---|---|
| Loom Width | LW | 1.52 meters (5.0 feet) |
| # of Facets | nf | 6 |
| # of Horizontal Pixels | nhp | 733 |
| # of Vertical Pixels | nvp | 244 |
| Horizontal Element Size | $ES_h$ | $11.5 \times 10^{-6}$ meters |
| Vertical Element Size | $ES_v$ | $27.0 \times 10^{-6}$ meters |
| Distance From Loom | R2 | 0.85 meters (2.8 feet) |
| Diffraction Factor | ks | 2 |
| Wavelength of Light | $\lambda$ | $6 \times 10^{-7}$ meters |

Some of the corresponding parameters values calculated using the equations given hereinabove for the parameters of Table 1 are given in Table 2 and the resulting placement of the six mirrors $28_i$ of the prototype mirror array 22 are listed in Table 3.

The placement of mirrors $28_i$ based on the equations detailed herein above occasionally results in some interference between mirrors $28_i$. That is to say, some mirrors $28_i$ might need to be located where others are already. This problem is overcome by slightly shifting any interfering mirrors. Interfering mirrors may be shifted slightly because, in general, there is a range of locations rather the a single location that result in acceptable performance. In the prototype, it was necessary to move several mirrors up to 2 inches from the locations calculated by use of the above referenced equations to avoid

TABLE 2

Calculated parameters for the prototype mirror array design.

| Parameter | Variables | Value |
|---|---|---|
| Segment Width | SW | 0.25 meters (0.83 feet) |
| Horizontal Resolution | $RES_h$ | $4 \times 10^{-4}$ meters |
| Vertical Resolution | $RES_v$ | $8 \times 10^{-4}$ meters |
| Magnification | M | 30.132 |
| Focal Length | fl | $2.74 \times 10^{-2}$ meters |
| Needed Depth of Field | $FO_{needed}$ | $1.509 \times 10^{-1}$ meters |
| Minimum Focal Ratio | $f\#_{min}$ | 7.0 |
| Maximum Focal Ratio | $f\#_{max}$ | 9.3 |
| Optimum Focal Ratio | f# | 8.1 |
| Effective Aperture | $A_e$ | $3.4 \times 10^{-3}$ meters |
| Height of Object | $H_o$ | $1.985 \times 10^{-1}$ meters |
| Height of Strip | $H_s$ | $1.8 \times 10^{-2}$ meters |
| Mirror Guard Distance | mgd | $1.354 \times 10^{-1}$ meters | interference. For the prototype example, the final mirror placements are as listed in Table 3 where the parameters $\{x_1, y_1, z_1\}$ are the locations of the lower corner of a given mirror closest to the camera while $\{x_2, y_2, z_2\}$ are the locations of the upper corner of a given mirror farthest from the camera 11. The values are in millimeters and are relative to a fixed reference location at the camera lens in a Cartesian coordinate system with the x-dimension representing distance from the camera lens parallel to the line of sight of the lens. The z dimension represents height and is perpendicular to a plane containing the camera 11 and a ray extending from the mirror array 22 center line C/L to the scene 26.

TABLE 3

Locations of the lower Corners of the Mirrors in the Prototype Array (dimensions in millimeters).

| Mirror # | $x_1$ | $y_1$ | $x_2$ | $y_2$ | $z_1$ | $z_2$ |
|---|---|---|---|---|---|---|
| 1 | 182.9 | −23.4 | 283.0 | 27.0 | 12.7 | 20.4 |
| 2 | 235.6 | −35.5 | 340.8 | 41.9 | 20.4 | 29.4 |
| 3 | 309.7 | −44.6 | 401.2 | 52.5 | 29.4 | 39.9 |
| 4 | 343.3 | −44.4 | 410.8 | 51.4 | 39.9 | 50.9 |
| 5 | 300.2 | −38.0 | 346.9 | 43.2 | 50.9 | 60.8 |
| 6 | 172.4 | −27.5 | 201.6 | 30.7 | 60.8 | 67.3 |

The six facet mirror array 22 of the prototype yielded a 0.0013 inch resolution over the entire six foot object width of the object being monitored. This proved to be sufficient resolution to detect the presence or absence of a typical warp thread in a textile loom 14.

As described above, the effect of the mirror array 22 is to image portions of the object plane onto the image plane 21. In the example application described hereinabove, the object plane was the input of a loom 14 and the image plane 21 was the CCD array inside a camera 11. FIG. 7 illustrates the concept for the five mirror $28_i$ mirror array 22 illustrated in FIG. 5. The high aspect ratio AR object plane containing 5 segments, S1 through S5, is imaged onto the low aspect ratio AR image plane 21 as successively stacked images I1 through I5. This results in the desired mapping of the object plane into the image plane 21. For the loom 14 example hereinabove, all the warp threads can be viewed with adequate resolution by a single, commercially available CCD camera 11. Therefore, the need for multiple cameras of the prior art is eliminated.

While an example of a loom monitoring system was used in this discussion, it is anticipated and within the scope of the invention that there are many high aspect ratio monitoring situations or applications that could benefit from the present invention. One such application is the use of the mirror array 22 of the present invention in conjunction with the camera and a suitable computer system on board an ocean-going vessel to monitor the visible horizon for the appearance of other surface vessels.

Another application for the mirror array 22 of the present invention is the reading of barcodes used to identify and catalog items. In this monitoring and identification application, the imaging device formerly identified as a camera 11 is replaced by a barcode reader, a device that images, detects and analyzes variable width parallel bars used to mark items for identification purposes. Cameras are often used as barcode readers. The mirror array 22 of the present invention is used to extend the field of view of the bar-code reading device thereby reducing the need for careful placement of the barcode relative to the FOV 20 of the barcode reader. As in the loom monitoring example cited above, the practice of the present invention has the effect of mapping an extended high aspect ratio scene into the low aspect ratio FOV 20 of the typical barcode reader. To better understand this application of the present invention, a specific example will now be discussed with the understanding that the same principles can be applied to a wide variety of similar applications.

Figure 8:
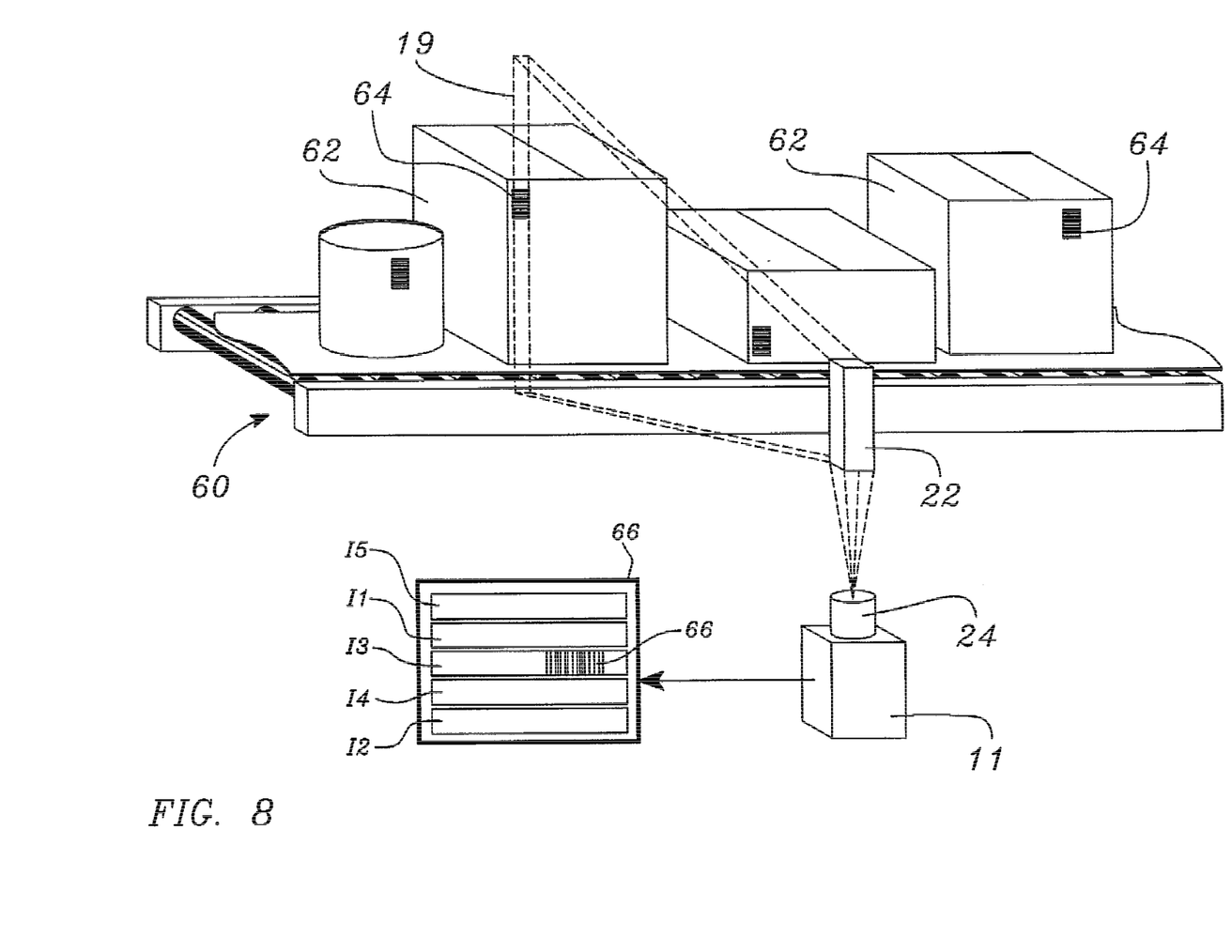
FIG. 8 illustrates objects on a conveyor belt system monitored and identified by the present invention.

Consider the example of monitoring and identifying objects 62 on a conveyor belt system 60 using barcodes 64 on these objects 62 as illustrated in FIG. 8. The 5 mirror $28_i$ mirror array 22 is positioned between the camera 11 and the objects 62. The mirror array 22 as described hereinabove maps a long, high aspect ratio scene 19 into the low aspect ratio FOV of the barcode reader or camera 11. As before, the lens 24 of the camera 11 is largely responsible for defining the FOV of the camera. The effect is that barcodes located anywhere on the side of the objects 62 facing the mirror array 22 are detectable by the barcode reader or camera 11. The image plane 68 of the barcode reader or camera is also illustrated in FIG. 8. The barcode image 66 of the barcode 64 passing through the scene 19 ends up in one of the image segments I1 through I5 depending on the location of the barcode 64 on the side of the object 62. A single barcode reader or camera 11 is therefore able to detect barcodes anywhere on the objects 62 by virtue of the mirror array 22 of the present invention. Without the mirror array 22 multiple barcode readers or cameras 11 would be necessary.

Thus there has been disclosed a mirror array apparatus 22 that functions in conjunction with a camera 11 as a means for efficiently monitoring high aspect ratio objects. Changes and modifications may be made to the invention which may be readily apparent to those skilled in the art without going beyond the intended scope of the invention, as defined by the appended claims.

What is claimed is:

1. A system for monitoring changes in a scene that has a first aspect ratio comprising:

a mirror array of more than two mirrors, and means for imaging the scene having a field of view with a second aspect ratio, the scene being a long, narrow region, longer than it is wide, such that the first aspect ratio of the scene is more than twice the second aspect ratio of the field of view of the imaging means, wherein the mirror array is disposed between the imaging means and the scene and is aligned along an optical axis of the imaging means such that the scene is viewed by the imaging means in segments, said segments of the scene being directed by the mirrors of the mirror array to appear in distinct regions of the field of view of the imaging means, and wherein each of the mirrors of the mirror array are distributed along an array centerline extending along the optical axis of the imaging means, each of the mirrors having a respective centerline, wherein the centerline of a first mirror of the mirror array is located a distance mgd units from the imaging means, and wherein the centerlines of the remaining mirrors of the mirror array are located a distance greater than mgd from the imaging means such that all segments of the scene are in focus with respect to the imaging means, and wherein mgd is given by $$mgd = \frac{R2 - A_3}{H_s + A_e}$$

where R2 is number of units from the centerline of the first mirror to a plane containing the scene, $A_e$ is an effective aperture given by $$A_e = \frac{fl}{f\#}$$

wherein fl is a focal length of the imaging system, and f# is a focal ratio of the imaging system,
and where $H_s$ is given by $$H_s = \frac{H_o}{2 \cdot nf - 1}$$

wherein nf is the number of mirrors in the mirror array, and $H_o$ is a term dependent on a minimum resolution.

2. The monitoring system of claim 1, wherein the segments of the scene are in a vertically stacked relationship in the field of view of the imaging means in order to monitor the entire length of the scene, and
wherein the long and narrow scene is viewed from a single direction relative to and on one side of the optical axis of the imaging means.

3. The monitoring system of claim 2 wherein the imaging means is a barcode reader.

4. The monitoring system of claim 1 wherein the means for imaging is a video camera.

5. The monitoring system of claim 4 wherein the video camera has a charge coupled device (CCD) focal plane array.

6. The monitoring system of claim 4, wherein the scene is a textile loom and the monitoring system monitors for breaks in warp threads.

7. The monitoring system of claim 1 further comprising means for automatically processing images from the imaging means to provide real-time information about changes in the scene.

8. The monitoring system of claim 1 wherein the $H_o$ is given by $$H_o = nvp \cdot RES_v$$

where nvp is a number of pixels provided by the imaging systems in a vertical direction, and
$RES_v$ is given by $$RES_v = \frac{ES_v}{ES_h} \cdot RES_h$$

wherein $ES_v$ is the unit spacing of pixels in the vertical direction, $ES_h$ is the unit spacing of pixels in a horizontal direction in a focal plane of the imaging means, and $RES_h$ is the minimum resolution in the horizontal direction.

9. The monitoring system of claim 8 wherein each of the mirrors of the mirror array are oriented such that angle $\gamma_i$ of an ith mirror, relative to the centerline is given by $$\gamma_i = \frac{\psi_i}{2} + \frac{\pi}{4}$$

where
i ranges from 1 to N, and
$\psi_i$ is given by $$\psi_i = \tan^{-1}\left(\frac{AP_i + DA_i}{R2}\right)$$

wherein
$AP_i$ is an ith aim point in the scene, and
$DA_i$ is a distance from the first mirror to the ith mirror, and wherein N is a positive integer greater than 2 and the first mirror corresponds to i=1.

* * * * *